No. 672,129. Patented Apr. 16, 1901.
A. MACY.
CHEESE PRESS.
(Application filed Sept. 28, 1900.)
(No Model.)

Witnesses
Harry S. Rohrer
Herbert A. Lawson

Inventor:
Amanda Macy.
By Victor J. Evans. Attorney

UNITED STATES PATENT OFFICE.

AMANDA MACY, OF HARDING, SOUTH DAKOTA.

CHEESE-PRESS.

SPECIFICATION forming part of Letters Patent No. 672,129, dated April 16, 1901.

Application filed September 28, 1900. Serial No. 31,386. (No model.)

*To all whom it may concern:*

Be it known that I, AMANDA MACY, a citizen of the United States, residing at Harding, in the county of Harding and State of South Dakota, have invented certain new and useful Improvements in Cheese-Presses, of which the following is a specification.

This invention relates to new and useful improvements in presses or separators for use in manufacturing "cottage" or "Dutch" cheese; and its primary object is to provide a simple device of durable and inexpensive construction adapted to readily separate the whey from the curd and which may be readily taken apart for cleaning, &c.

To these ends the invention consists in the novel construction and combination of parts hereinafter more fully described and claimed, and illustrated in the accompanying drawings, showing the preferred form of my invention, and in which—

Figure 1:
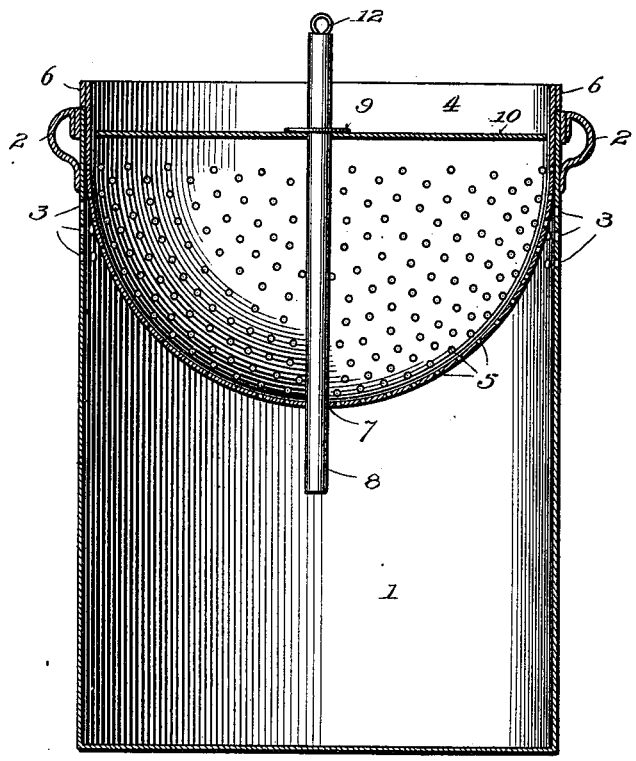
Figure 2:
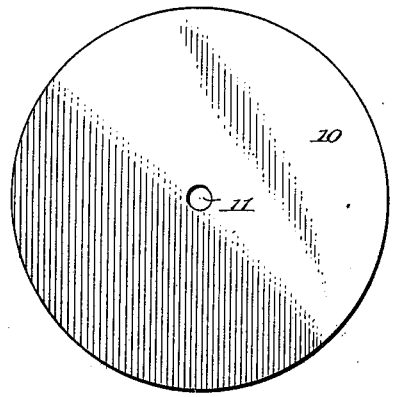

Figure 1 is a central vertical transverse section therethrough. Fig. 2 is a plan view of the pressing-disk, and Fig. 3 is a detail perspective view of the plunger-stem.

Referring to said figures by numerals of reference, 1 is a cylindrical vessel, formed of any suitable material, having handles 2 and provided below the handles with a series of perforations 3, as shown. Fitted within the upper portion of the vessel 1 is a basin 4, preferably of semispherical form, provided with perforations 5 therein and having a rim or flange 6 about the upper edge thereof, adapted to rest upon the upper end of the vessel 1 and be supported thereby.

Figure 3:
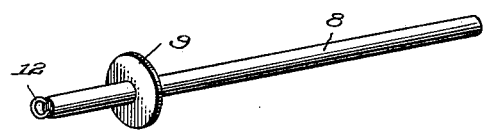

Within the center of the basin 4 is a passage 7, adapted to receive a stem 8, as shown in Fig. 3, which is provided at a point near its upper end with an annular flange 9, adapted to bear upon the upper surface of a disk 10, having an opening 11 in the center thereof for the reception of said stem. If desired, a ring, as 12, may be secured to the upper end of the stem to permit the same to be hung up out of the way when not in use.

In operation the clabber is placed within the basin 4, and the stem 8 is then inserted through the disk 10 and the passage 7 within the basin.

It is obvious that the whey will drain off into the vessel through the perforations in the basin 4, the openings 3 within said vessel permitting the escape of hot air, &c.

The disk 10 serves to compress the curd within the basin, and, if desired, weights may be placed thereon to facilitate the work.

It will be understood that disks of different diameters may be used with my device, according to the amount of material to be compressed, and, if desired, the basin may be made cylindrical in form instead of semispherical, as shown.

In the accompanying drawings I have shown the preferred form of my invention; but I do not limit myself to all of the details shown, as modifications may be made therein without departing from the spirit of the invention, and I therefore reserve the right to make such changes as may fall within the scope of the following claims.

I claim—

1. In a device of the character described, the combination with a vessel; of a perforated basin therein, a stem slidably mounted in the bottom of said basin, a vertically-movable disk within the basin, and a flange upon the stem adapted to bear upon said disk.

2. In a device of the character described, the combination with a vessel having perforations therein, of a perforated basin suspended therein, a stem slidably mounted in the bottom of said basin, an annular flange upon the stem, and a movable disk upon which said flange bears.

3. In a device of the character described, the combination with a vessel having perforations, of a perforated basin, a flange thereon adapted to bear upon the upper edge of the vessel, a movable disk, and a vertically-movable stem within said basin and having a flange adapted to bear upon said disk.

In testimony whereof I affix my signature in presence of two witnesses.

AMANDA MACY.

Witnesses:
F. P. STEARNS,
F. C. SULINGER.